(12) United States Patent
Spillman et al.

(10) Patent No.: US 12,515,141 B2
(45) Date of Patent: Jan. 6, 2026

(54) TRANSBRAKING SYSTEM FOR A MODEL VEHICLE

(71) Applicant: TRAXXAS, L.P., McKinney, TX (US)

(72) Inventors: Daryl Gene Spillman, Plano, TX (US); Scott Rollin Schmitz, Lewisville, TX (US); Wesley R. Erhart, McKinney, TX (US)

(73) Assignee: TRAXXAS, L.P., McKinney, TX (US)

( * ) Notice: Subject to any disclaimer, the term of this patent is extended or adjusted under 35 U.S.C. 154(b) by 337 days.

(21) Appl. No.: 17/689,597

(22) Filed: Mar. 8, 2022

(65) Prior Publication Data

US 2022/0288500 A1 Sep. 15, 2022

Related U.S. Application Data

(60) Provisional application No. 63/160,513, filed on Mar. 12, 2021.

(51) Int. Cl.
*A63H 30/04* (2006.01)
*G05D 1/00* (2024.01)

(52) U.S. Cl.
CPC ........... *A63H 30/04* (2013.01); *G05D 1/0011* (2013.01)

(58) Field of Classification Search
CPC ....... A63H 30/04; A63H 17/00; G05D 1/0011
See application file for complete search history.

(56) References Cited

U.S. PATENT DOCUMENTS

| | | | |
|---|---|---|---|
| 4,596,215 A * | 6/1986 | Palesotti | B60W 10/06 123/349 |
| 6,130,513 A | 10/2000 | Orton | |
| 7,866,762 B1 * | 1/2011 | Hamilton | B60T 13/74 303/20 |
| 8,287,328 B2 | 10/2012 | del Castillo | |
| 10,525,370 B1 * | 1/2020 | Poteet | A63H 30/04 |

(Continued)

FOREIGN PATENT DOCUMENTS

| | | |
|---|---|---|
| KR | 1020130063793 A | 6/2013 |
| WO | 2014188103 A1 | 11/2014 |
| WO | 2018140889 A1 | 8/2018 |

OTHER PUBLICATIONS

Novak Electronics Inc. Drag Brakes and The Cyclone (RC car action 1997) 1 page (Year: 1997).

(Continued)

*Primary Examiner* — Navid Z. Mehdizadeh
*Assistant Examiner* — Shelley Marie Osterhout
(74) *Attorney, Agent, or Firm* — Daryl R. Wright; Greg Carr

(57) ABSTRACT

A radio controlled model vehicle system, transmitter, and method are provided. The radio controlled model vehicle system includes a transmitter containing a transbrake actuator and a throttle input producing throttle commands. The radio controlled model vehicle may include a receiver that receives the throttle commands sent by the transmitter. Wherein the transmitter sends the throttle command corresponding to a position of the throttle input to the receiver when the transbrake actuator is not engaged and sends a throttle command corresponding to a neutral position of the throttle input when the transbrake actuator is engaged. In addition, wherein a motor of the radio controlled model vehicle is powered at a rate corresponding to the throttle command.

4 Claims, 1 Drawing Sheet

(56) References Cited

U.S. PATENT DOCUMENTS

| | | |
|---|---|---|
| 11,084,396 B2 | 8/2021 | Dastoor et al. |
| 2003/0169002 A1 | 9/2003 | Hughes |
| 2004/0226768 A1 | 11/2004 | DeLuca et al. |
| 2007/0293125 A1 | 12/2007 | Jenkins et al. |
| 2012/0074770 A1 | 3/2012 | Lee |
| 2012/0272775 A1* | 11/2012 | Boyd ................. G05G 1/04 463/58 |
| 2012/0312645 A1 | 12/2012 | Frashure et al. |
| 2012/0330481 A1 | 12/2012 | Feldkamp et al. |
| 2014/0136069 A1 | 5/2014 | Jung et al. |
| 2014/0235137 A1 | 8/2014 | Allmendinger et al. |
| 2015/0015376 A1 | 1/2015 | Jenkins |
| 2015/0096819 A1 | 4/2015 | Grajkowski et al. |
| 2015/0151725 A1 | 6/2015 | Clarke et al. |
| 2016/0244039 A1 | 8/2016 | Rizzo et al. |
| 2022/0288500 A1* | 9/2022 | Spillman ............. G05D 1/0011 |

OTHER PUBLICATIONS

International Search Report, mailed May 15, 2018, by the ISA/KR, re PCT International App No. PCT/US2018/015769.
Written Opinion, mailed May 15, 2018, by the ISA/KR, re PCT International App No. PCT/US2018/015769.
European Search Report; European Patent Application No. EP 18744706; Sep. 7, 2020.

* cited by examiner

TRANSBRAKING SYSTEM FOR A MODEL VEHICLE

RELATED APPLICATIONS

This application claims the benefit of a related U.S. Provisional Application Ser. No. 63/160,513, filed Mar. 12, 2021, entitled "TRANSBRAKING SYSTEM FOR A MODEL VEHICLE," to Daryl Gene SPILLMAN, et al., the contents of which are incorporated by reference herein in their entirety.

BACKGROUND

The following descriptions and examples are not admitted to be prior art by virtue of their inclusion in this section.

Radio-Controlled or RC model vehicles are a popular hobby for a growing segment of the population. The hobby is at the point to where there are specific segments catering to different styles of RC model vehicles. There are crawlers, usually four-wheel drive RC vehicles that are run on technical trails in which an operator has to overcome natural obstacles. There are off-road racers, two- or four-wheel drive RC vehicles used for racing around dirt tracks. And there are on road racers, two- or four-wheel drive vehicles used for racing around paved or hard tracks in which the RC vehicles are capable of high-speed operation. A recently growing segment of the hobby are drag racers. For drag racers, timing and speed along a straight course are elements that can separate winners from losers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with one embodiment, a radio-controlled model vehicle system 100 is provided that includes a transmitter 102. The transmitter 102 may include a transbrake actuator 131 and a throttle input 133 producing throttle commands. The radio-controlled model vehicle system further comprises a radio-controlled model vehicle 101 including a receiver 110 that receives the throttle commands sent by the transmitter 102. Wherein the transmitter 102 sends the throttle command corresponding to a position of the throttle input 133 to the receiver 110 when the transbrake actuator 131 is not engaged and the transmitter 102 sends a throttle command corresponding to a neutral position of the throttle input 133 when the transbrake actuator 131 is engaged. And a motor 116 of the radio-controlled model vehicle 101 is powered at a rate corresponding to the throttle command.

In accordance with another embodiment, a transmitter 102 for a radio-controlled model vehicle system 100 is provided. The transmitter 102 includes a transbrake actuator 131 and a throttle input 133 producing throttle commands. Wherein the transmitter 102 sends the throttle command corresponding to a position of the throttle input 133 to a receiver 110 provided in the radio-controlled model vehicle 101 when the transbrake actuator 131 is not engaged. And the transmitter 102 sends a throttle command corresponding to a neutral position of the throttle input 133 when the transbrake actuator 131 is engaged.

In accordance with still another embodiment, a method for launching a radio-controlled model vehicle 101 is provided. The method includes engaging a transbrake actuator 131 of a transmitter 102 and transmitting a throttle command corresponding to a neutral position of a throttle input 133 to a receiver 110 in the radio-controlled model vehicle 101. Additionally, the method further includes positioning the throttle input 101 to a desired position. The method also includes disengaging the transbrake actuator 131 and transmitting the throttle command corresponding to the desired position of the throttle input 133 to the receiver 110. And still further, the method includes powering a motor 116 of the radio-controlled model vehicle 101 at a rate corresponding to the throttle command.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
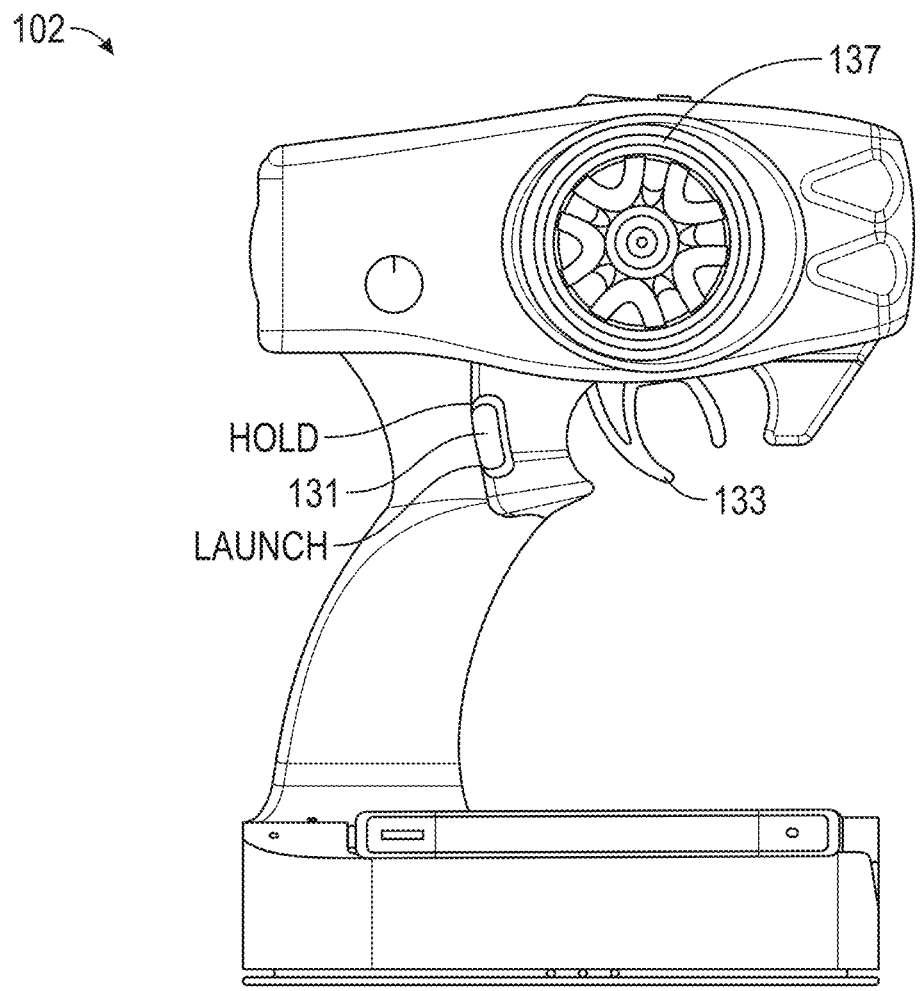
FIG. 1 is an elevated side view of a transmitter, in accordance to an embodiment of the current disclosure.
Figure 2:
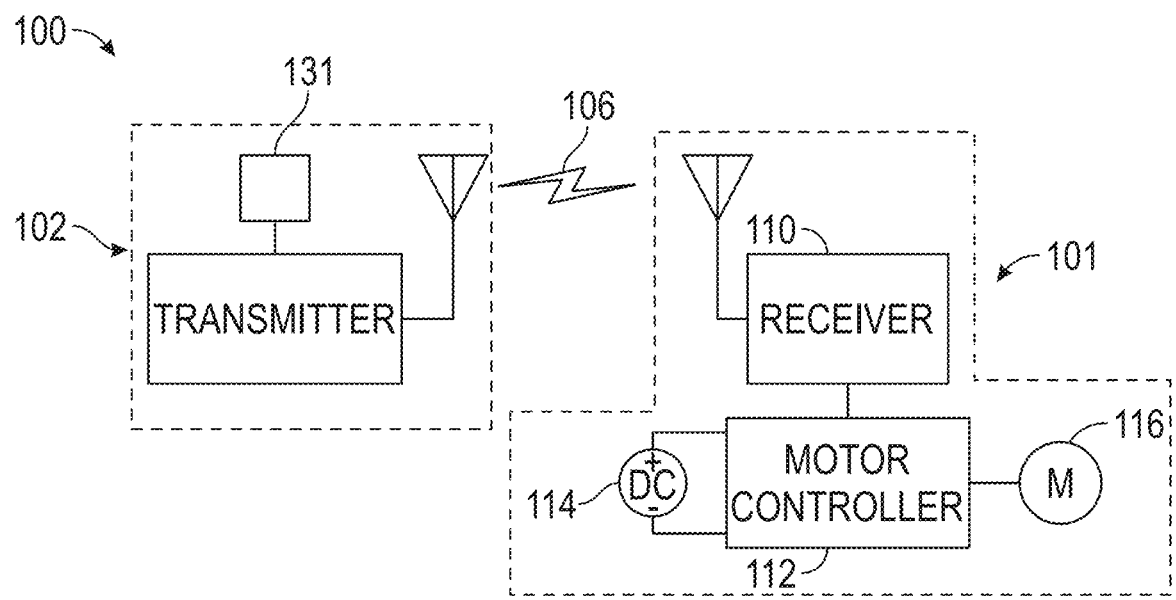
FIG. 2 is a schematic view of a transbraking system for a model vehicle, in accordance with an embodiment of the current disclosure.

In the following specification, numerous specific details are set forth to provide a thorough understanding of embodiments of the present disclosure. However, those skilled in the art will appreciate that the embodiments may be practiced without such specific details. In other instances, well-known elements have been illustrated in schematic or block diagram form in order not to obscure embodiments of the present disclosure in unnecessary detail.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

Radio-Controlled (RC) model vehicles 101 usually comprise a scale version of a model vehicle body coupled to a model vehicle chassis. An operator with a handheld transmitter 102 inputs steering 137, throttle 133, and braking 133 commands for transmission 106 to a receiver 110 located in the model vehicle chassis. In addition to the receiver 110, the model vehicle chassis will comprise the batteries 114, motors 116, electronic speed control (ESC) 112 for controlling the motor, and various servos for physically steering the RC model vehicle 101 for example.

In a sub segment of the RC vehicle hobby, drag racing is an increasing popular area to test and develop skills. Drag racing differs from more traditional road and off-road vehicles in that the RC model vehicle 101 is run along a straight course for a relatively short distance. Just as in the full-sized drag racing counterparts, the RC model vehicles 101 may exhibit burn out at the beginning of a race, something that is typically controlled by the operator reducing or increasing the throttle command for maximum acceleration and minimized slipping. For drag racing, launching the vehicle is one of the more critical areas with regards to winning a race.

One aspect of throttle control for an RC model vehicle 101 drag racer is the precise initial placement of a desired position of the throttle input 133 (e.g., throttle trigger) provided on the hand-held transmitter 102. However, another aspect of the initial launch is timing the movement to the desired position as closely as possible to the starting lights indicating the beginning of a race. In previous cases, as soon as the timing tree flashed a green light indicating it was time to go, an operator would have to move the throttle input 133 to the desired position.

Of course, while they are rapidly trying to get the throttle input 133 to the correct position, the operator must be careful not to react before the green start lights and also must be careful not to go short or beyond their ideal desired position of the throttle input 133. Going short would mean a launch without the maximum amount of power that is available. Going beyond the desired position may mean more slipping than desired at the beginning of the race, again possibly costing the operator the win.

According to an embodiment of the current disclosure, a transbraking system 100 for an RC model vehicle 101 has been developed to improve or optimize the starting or launching of an RC model vehicle 101. Although this disclosure has been written using drag racing as an illustrative example, there may be other applications or situations in which the teachings could equally apply.

The transbraking system 100 may include a handheld transmitter 102 comprising a steering input 137, a throttle input 133, and a transbraking actuator 131. The steering input 137 is for keeping the RC model vehicle 101 in the proper lane and the throttle input 133 is for adjusting the power provided to the motor 116 of the RC model vehicle 101. The amount of power provided to the motor 116 of the RC model vehicle 101 will approximately correspond to a position of the throttle input 133.

The RC model vehicle 101 according to an illustrative embodiment may comprise a receiver 110 for receiving a radio transmission 106 from the transmitter 102 and controlling various servo actuation according to transmitted inputs. In addition, the RC model vehicle 101 my also comprise a stored power supply, such as a battery pack 114 for electric motors 116 or a fuel tank for nitro or gasoline powered engines, along with an electric or internal combustion motor. Power provided to the motor 116 may be through a servo operating the throttle of a Nitro fueled engine or an electronic speed control for proving power to a brushed or brushless DC electric motor 116.

The transbraking actuator 131 allows an operator to place the throttle input 133 in the desired position without causing the RC model vehicle 101 to move. Unlike a full-sized vehicle, the throttle input 133 provides throttle commands, forward or reverse commands, and braking commands. The operator is unable to simultaneously move the throttle input 133 into a desired position while simultaneously braking as they may be able to do in a full-sized vehicle. Any operation of the throttle input 133 after the RC model vehicle 101 is stationary will cause the RC model vehicle 101 to move either forward or reverse.

The throttle input 133 may provide different functions according to the throttle position. Pulling the throttle input 133 towards the transmitter handle may indicate various levels of forward power provided to the motor 116. The throttle input's 133 resting position is a neutral position, in which no or zero power is provided to the motor 116. Pushing the throttle input 133 away from the transmitter handle may do one of two things, either move the RC model vehicle 101 in reverse if this occurs after the RC model vehicle 101 is stationary or applying a braking force if the RC model vehicle 101 is moving.

The transbraking actuator 131 is used to engage and disengage the transbrake. In some cases, the RC model vehicle 101 must be stopped and/or the throttle input 133 in the neutral position to engage the transbrake. These constraints are used to help prevent inadvertent actuation of the transbrake which would remove the ability of the throttle input 133 to affect the RC model vehicle 101.

In this particular embodiment, the transbraking actuator 131 is shown as a thumb switch, in which, pressing the thumb switch engages the transbrake when appropriate, and releasing the thumb switch disengages the transbrake. In other embodiments, other types of operative switches, knobs, and sensors, etc. may be used. When the transbrake is engaged, the transmitter 102 transmits the throttle position corresponding to the neutral position, resulting in a zero-throttle command.

This allows an operator to press the transbraking actuator and engage the transbrake. Once the transbrake is engaged, the operator may precisely adjust the throttle position of the throttle input to what they consider to be a desired position, without causing the RC model vehicle to move.

When the signal tree flashes green, the operator merely has to disengage the transbrake, in some cases this would involve releasing a thumb switch, pressing a mechanical switch, or some other appropriate method according to the application. Once disengaged, the throttle position of the throttle input 133 is read, and the RC model vehicle 101 is launched with a throttle command corresponding to the throttle position. The result is a potential reduction in reaction time along with a potential increase in precision of initial throttle position for an optimum launching scenario.

In some embodiments, the throttle position of the throttle input 133 should be in a neutral position for a desired length of time to prevent inadvertent engagement of the transbrake. For example, some embodiments may use 100 milliseconds as the length of time of the throttle input 133 in the neutral position. Similarly, depending upon the type of transbrake actuator 131 involved, there may be other time delays (or dampening or debouncing). For example, a thumb button may be pressed or other action used to engage the transbrake may be consistent for 50 milliseconds to engage. And to signal disengagement, the thumb button may be released or other action indicating disengagement may be consistent for approximately 15 milliseconds to disengage the transbrake.

By having the throttle input 133 at a neutral throttle position before engagement, an operator is inhibited from accidentally pressing a thumb switch (for example) and engaging the transbrake during a race. By further having the time delay, an operator is inhibited from accidentally or inadvertently activating the transbrake actuator 131 during the end of a race when the throttle input 133 passes through the neutral position while being moved from forward acceleration to braking.

Previous transbraking systems 100 may have relied on modified receivers to implement the same types of functionalities. With current embodiments, a relatively standard RC model vehicle receiver 110 may be used as the transbraking actuator 131 allows the transmitter 102 to control the transbraking system 100.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

Although only a few example embodiments have been described in detail above, those skilled in the art will readily appreciate that a wide range of variations, modifications, changes, and substitutions are contemplated in the foregoing disclosure and, in some instances, some features of the present disclosure may be employed without a corresponding use of the other features In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

It is the express intention of the applicant not to invoke 35 U.S.C. § 112, paragraph 6 for any limitations of any of the claims herein, except for those in which the claim expressly uses the words 'means for' together with an associated function.

What is claimed is:

1. A radio-controlled model vehicle system comprising:
   a transmitter comprising:
      a trans brake actuator;
      a throttle trigger producing throttle commands;
   a radio-controlled model vehicle comprising:
      a receiver that receives the throttle commands sent by the transmitter;
   wherein the throttle trigger is in the neutral position for a desired length of time to engage the trans brake actuator;
   wherein the transmitter sends the throttle command corresponding to a position of the throttle trigger to the receiver when the trans brake actuator is not engaged;
   wherein the transmitter sends the throttle command corresponding to a neutral position of the throttle trigger when the trans brake actuator is engaged; and
   wherein a motor of the radio-controlled model vehicle is powered at a rate corresponding to the throttle command.

2. The radio-controlled model vehicle system according to claim 1, wherein engaging the trans brake actuator comprises pressing and holding a thumb switch on the transmitter.

3. A radio-controlled model vehicle system comprising:
   a transmitter comprising:
      a trans brake actuator;
      a throttle trigger producing throttle commands;
   a radio-controlled model vehicle comprising:
      a receiver that receives the throttle commands sent by the transmitter;
   wherein the radio-controlled model vehicle is stationary for a desired length of time to engage the trans brake actuator:
   wherein the transmitter sends the throttle command corresponding to a position of the throttle trigger to the receiver when the trans brake actuator is not engaged;
   wherein the transmitter sends the throttle command corresponding to a neutral position of the throttle trigger when the trans brake actuator is engaged; and
   wherein a motor of the radio-controlled model vehicle is powered at a rate corresponding to the throttle command.

4. The radio-controlled model vehicle system according to claim 3, wherein engaging the trans brake actuator comprises pressing and holding a thumb switch on the transmitter.

* * * * *